(12) United States Patent
Siegel et al.

(10) Patent No.: US 7,778,925 B2
(45) Date of Patent: Aug. 17, 2010

(54) AUDIO AND VIDEO DIGITAL CONTENT DELIVERY

(75) Inventors: Jaime A. Siegel, Ridgewood, NJ (US); Toshimoto Mitomo, Edgewater, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2216 days.

(21) Appl. No.: 09/955,397

(22) Filed: Sep. 18, 2001

(65) Prior Publication Data

US 2003/0056212 A1    Mar. 20, 2003

(51) Int. Cl.
*G06F 17/27* (2006.01)

(52) U.S. Cl. .............................. 705/50; 705/51; 705/52; 705/1.1; 726/26; 726/27

(58) Field of Classification Search ................ 705/50, 705/51, 52
See application file for complete search history.

(56) References Cited

U.S. PATENT DOCUMENTS

| | | | | |
|---|---|---|---|---|
| 5,530,754 | A * | 6/1996 | Garfinkle | 725/8 |
| 5,613,032 | A * | 3/1997 | Cruz et al. | 386/69 |
| 5,619,247 | A * | 4/1997 | Russo | 725/104 |
| 5,629,980 | A * | 5/1997 | Stefik et al. | 705/54 |
| 5,638,113 | A * | 6/1997 | Lappington et al. | 725/141 |
| 5,715,403 | A * | 2/1998 | Stefik | 705/44 |
| 5,945,653 | A * | 8/1999 | Walker et al. | 235/380 |
| 6,101,485 | A * | 8/2000 | Fortenberry et al. | 705/27 |
| 6,131,086 | A * | 10/2000 | Walker et al. | 705/26 |
| 6,233,682 | B1 * | 5/2001 | Fritsch | 713/168 |
| 6,240,396 | B1 * | 5/2001 | Walker et al. | 705/26 |
| 6,243,142 | B1 * | 6/2001 | Mugura et al. | 348/564 |
| 6,262,722 | B1 * | 7/2001 | Allison et al. | 725/39 |
| 6,266,814 | B1 * | 7/2001 | Lemmons et al. | 725/44 |
| 6,268,849 | B1 * | 7/2001 | Boyer et al. | 725/40 |
| 6,268,864 | B1 * | 7/2001 | Chen et al. | 345/428 |
| 6,275,268 | B1 * | 8/2001 | Ellis et al. | 348/564 |
| 6,278,466 | B1 * | 8/2001 | Chen | 345/473 |
| 6,279,824 | B1 * | 8/2001 | Park | 235/379 |
| 6,282,713 | B1 * | 8/2001 | Kitsukawa et al. | 725/36 |
| 6,298,037 | B1 * | 10/2001 | Sharifi | 370/210 |
| 6,331,877 | B1 * | 12/2001 | Bennington et al. | 348/731 |
| 6,348,932 | B1 * | 2/2002 | Nishikawa et al. | 715/719 |
| 6,351,270 | B1 * | 2/2002 | Nishikawa et al. | 715/717 |
| 6,357,043 | B1 * | 3/2002 | Ellis et al. | 725/61 |

(Continued)

*Primary Examiner*—Calvin L Hewitt, II
*Assistant Examiner*—John M Winter
(74) *Attorney, Agent, or Firm*—Miller Patent Services; Jerry A. Miller

(57) ABSTRACT

A method of purchasing a soundtrack associated with A/V content. When A/V content is purchased by download or otherwise, the user is provided with an option to purchase or store the soundtrack. In one embodiment, the purchase of the motion picture secures usage rights to the soundtrack while another embodiment requires separate purchase of the soundtrack. In either case, the user is enabled to store the soundtrack as a separate file after having purchased rights to do so. The soundtrack is then stored, in some embodiments with digital rights management or copy protection to limit the number of copies that can be made of the soundtrack. The motion picture has a Table of Contents (TOC) indexing the soundtrack portions of the audio content of the motion picture to enable extraction of those portions of the motion picture forming the soundtrack.

24 Claims, 7 Drawing Sheets

U.S. PATENT DOCUMENTS

| | | | |
|---|---|---|---|
| 6,373,528 B1 * | 4/2002 | Bennington et al. | 348/569 |
| 6,388,713 B1 * | 5/2002 | Saiki et al. | 348/553 |
| 6,392,672 B1 * | 5/2002 | Kulik | 715/781 |
| 6,614,729 B2 * | 9/2003 | Griner et al. | 369/1 |
| 2002/0051407 A1 * | 5/2002 | Griner et al. | 369/1 |
| 2002/0199198 A1 * | 12/2002 | Stonedahl | 725/86 |
| 2007/0064943 A1 * | 3/2007 | Ginter et al. | 380/233 |

* cited by examiner

AUDIO AND VIDEO DIGITAL CONTENT DELIVERY

FIELD OF THE INVENTION

This invention relates generally to the field of digital content delivery systems and methods. More particularly, this invention relates to a system and method for purchase of portions of Audio/Video (A/V) content, such as for example a motion picture soundtrack, as a product distinct from the A/V content as a whole.

BACKGROUND OF THE INVENTION

With the emergence of broadband communication media, it is widely anticipated that full-length feature motion pictures and other A/V content will be available for purchase or rent in digital form via download or streaming from a content provider on a widespread basis. Purchase or rent may entail a transfer of rights under a digital rights management system, in which the rights transferred are transferred with, or in accordance with a "usage rule." The usage rule defines the nature of the rights acquired in the transaction. This new distribution mechanism presents new possibilities for the generation of revenue.

Often when one views a motion picture, one might enjoy the soundtrack associated with the motion picture and be inclined to purchase such a soundtrack. However, in general the motion picture viewer is rarely presented with an immediate opportunity to purchase the soundtrack and may lose interest by the time a purchase opportunity presents itself. Thus, opportunities for sale of the soundtrack content may be missed. Similar opportunities may exist for sale of other audio or video portions of A/V content, for example purchase of a theme song from a television program or purchase of a music selection featured in a music video.

SUMMARY OF THE INVENTION

Thus, there is need for systems and methods for acquiring rights to portions of A/V content separate and distinct from the full A/V content. The present invention relates generally to digital content delivery methods and apparatus for satisfying this need. Objects, advantages and features of the invention will become apparent to those skilled in the art upon consideration of the following detailed description of the invention.

In one embodiment consistent with the present invention, a method of purchasing a soundtrack associated with A/V content is provided. When A/V content is purchased by download or otherwise, the user is provided with an option to purchase or store the soundtrack. In one embodiment, the purchase of the motion picture secures usage rights to the soundtrack while another embodiment requires separate purchase of the soundtrack. In either case, the user is enabled to store the soundtrack as a separate file after having purchased rights to do so. The soundtrack is then stored, in some embodiments with digital rights management or copy protection to limit the number of copies that can be made of the soundtrack. The motion picture has a Table of Contents (TOC) indexing the soundtrack portions of the audio content of the motion picture to enable extraction of those portions of the motion picture forming the soundtrack.

In one embodiment consistent with aspects of the present invention, a method of delivering digital content comprises transferring audio/video (A/V) content in digital form from a content provider to a customer, the digital form of the A/V content comprising at least an audio portion and a video portion; providing the customer with an option to complete a transaction for a selected one of the portions of the A/V content; and in the event the customer elects to complete the transaction for the selected portion, enabling the customer to store the selected portion distinct from the A/V content.

In another embodiment consistent with aspects of the present invention, a method of purchasing digital content comprises transferring audio/video (A/V) content in digital form from a content provider to a customer, the digital form of the A/V content comprising at least an audio portion and a video portion; completing a transaction for a selected one of the portions of the A/V content; and storing the selected portion as at least one digital file distinct from the A/V content.

In another embodiment consistent with aspects of the present invention, a method of delivering digital content comprises receiving a request from a customer for transfer of A/V content in digital form to the customer; receiving payment from the customer for the transfer of the A/V content in accordance with a first usage rule; transferring audio/video (A/V) content in digital form from a content provider to the customer in accordance with the first usage rule, the digital form of the A/V content comprising at least an audio portion and a video portion; providing the customer with an option to complete a transaction for a selected one of the portions of the A/V content; receiving a request from the customer to complete the transaction for the selected portion; and enabling the customer to store the selected portion as at least one digital file distinct from the A/V content.

In another embodiment consistent with aspects of the present invention, a method of acquiring rights to digital content, comprises sending a request to acquire digital rights in A/V content to a content provider; sending a payment for the digital rights to the content provider; receiving audio/video (A/V) content in digital form from the content provider, the digital form of the A/V content comprising at least an audio portion and a video portion; receiving an option to acquire digital rights to a selected portion of the A/V content; sending a request to the content provider acquire digital rights to the selected portion; and storing the selected portion distinct from the A/V content.

In another embodiment consistent with aspects of the present invention, a method of delivering digital content comprises providing audio/video (A/V) content in digital form from a content provider to a customer, the digital form of the A/V content comprising at least an audio portion and a video portion; providing the customer with an option to store the selected portion of the A/V content; and in the event the customer elects to store the selected portion, enabling the customer to store the selected portion distinct from the A/V content.

A method of acquiring digital content, consistent with an embodiment of the present invention comprises receiving audio/video (A/V) content in digital form from a content provider to a customer, the digital form of the A/V content comprising at least an audio portion and a video portion; and storing one of the portions as a selected portion distinct from the A/V content.

In another embodiment consistent with aspects of the present invention, a method of storing audio/video (A/V) content comprises storing a video portion; storing an audio portion; wherein the A/V content comprises at least the video portion together with the audio portion; and storing a table of contents (TOC) that indexes a selected one of the audio and video portions in a manner that permits retrieval of the selected portion.

Any of the processes described above can be carried out on a programmed processor and instructions for carrying out such processes can be stored on any suitable storage medium and transmitted over any suitable transmission medium.

An e-commerce server consistent with an embodiment of the present invention has a programmed processor. A mass storage device stores a selection of A/V content, the A/V content comprising at least an audio portion, a video portion and a table of contents (TOC) file indexing a selected one of the audio and video portions. A program runs on the programmed processor, for: presenting a customer with an opportunity to complete a transaction to acquire rights to the selected one of the audio and video portions indexed by the TOC; and enabling the customer to store the selected portion.

An apparatus for carrying out an e-commerce transaction consistent with an embodiment of the present invention has a programmed processor. A mass storage device is provided suitable for storing digital files. A program runs on the programmed processor, for: presenting a user with an opportunity to complete a transaction to acquire rights to a selected one of audio and video portions of A/V content indexed by a table of contents (TOC); and enabling the user to store the selected portion as a digital file by reference to the TOC.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
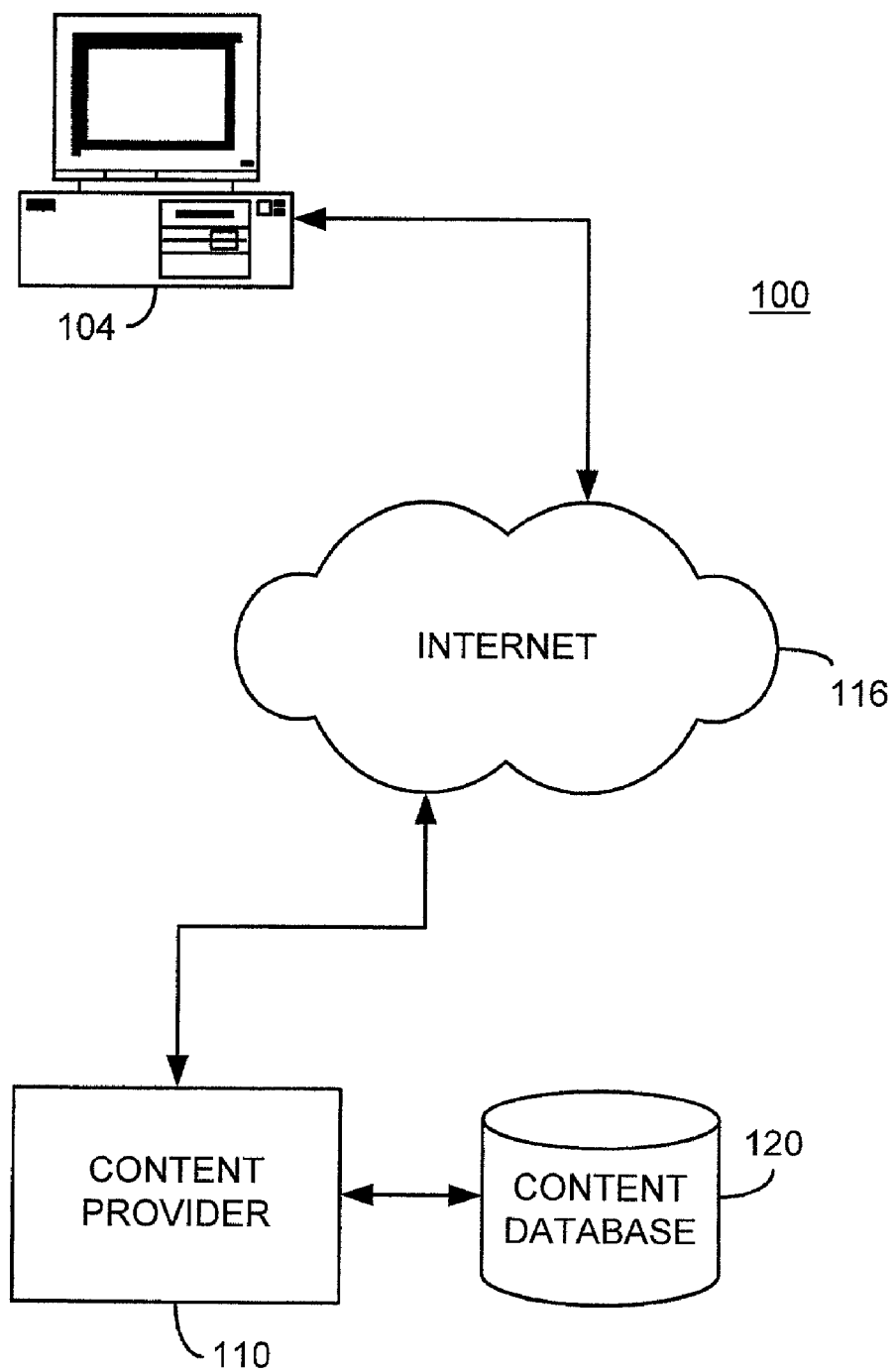
FIG. 1 is a block diagram of an exemplary digital content delivery arrangement consistent with an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

For purposes of the present invention, a purchase or rent of A/V content or a portion thereof may entail a transfer of rights under a digital rights management system, in which the rights transferred are transferred with, or in accordance with a "usage rule." The usage rule defines the nature of the rights acquired in the transaction. By way of example, and not limitation, a usage rule may define that a user can, in exchange for compensation, "play" the content or portion thereof a specific number of times before the content or portion thereof expires. Another exemplary usage rule may define that a user can play the content or portion thereof an unlimited number of times for a particular defined period of time before the content or portion thereof expires. Another exemplary usage rule may define that a user can play the content or portion thereof an unlimited number of times without the content or portion thereof ever expiring. Other exemplary usage rules can specify a number of copies that can be made of the content or the number of machines the content can reside upon. The compensation may be paid directly, as in the case of a purchase of rights over the Internet, or may be paid indirectly to a third party (e.g., a service provider such as an Internet Service Provider or cable system operator). The compensation may be for a specific selection of content or for a package of content from which the user may make limited or unlimited selections. The term "purchase" as used herein, thus generally refers to rights acquired as a result of completing a transaction that may be restricted by a usage rule.

Referring now to FIG. 1, a system 100 can be utilized to purchase audio/video content such as full-length motion pictures, films, videos, audio soundtracks, interviews, concerts, television programs, etc. in digital form. In this exemplary system 100, a user's personal computer 104 is connected to a content provider 110 via the Internet 116 (or alternatively via any communication network, wired or wireless, that can accommodate the transactions described herein). This connection may be, but is not necessarily, effected using high-speed broadband connections such as DSL, cable modem, etc., as well as wireless connections, cable systems and other techniques.

The content provider 110 has a content database 120 containing a selection of motion pictures or other A/V content that can be downloaded, streamed or otherwise transferred to the user at computer 104. The A/V content, in accordance with embodiments of the present invention, contains at least an audio portion and a video portion. In embodiments consistent with the present invention, at least one of either the audio portion, video portion or audio video portion (or equivalently parts thereof) may be saved as one or more digital files that are separate and distinct from the A/V content itself. The A/V content, in accordance with certain embodiments of the present invention may be compressed. Compression such as MPEG-2, MPEG-3, MPEG-4 and MPEG-7 or other suitable compression algorithms may be used without departing from the present invention.

In one example, once the computer user of computer 104 has downloaded a motion picture (or other A/V content that has an audio and a video portion), it is desirable in one embodiment of the invention to provide that user with an option to purchase (or otherwise acquire rights in accord with a usage rule to) a portion of the A/V content (e.g., a soundtrack of the motion picture). Thus, for example, the user upon viewing the motion picture or upon determining that he or she wishes to purchase the soundtrack, can do so immediately. In this manner, the likelihood of sale of the soundtrack is enhanced.

In accordance with certain embodiments, all of the music and other audio content associated with a conventional soundtrack recording (or other portion of the A/V content), as might be purchased in the form of a compact disc or saved in any suitable digital format such as MP3, ATRAC, any of the MPEG standards, etc., is available in an appropriate format on the downloaded motion picture. The soundtrack (or other audio content) is appropriately indexed, for example, in a Table of Contents file (TOC), so that the user can selectively copy the audio portion or other selected portion of the motion picture. In this example, a motion picture will normally have both audio and video portions as well as the TOC as described in accordance with certain embodiments of the present invention.

Figure 2:
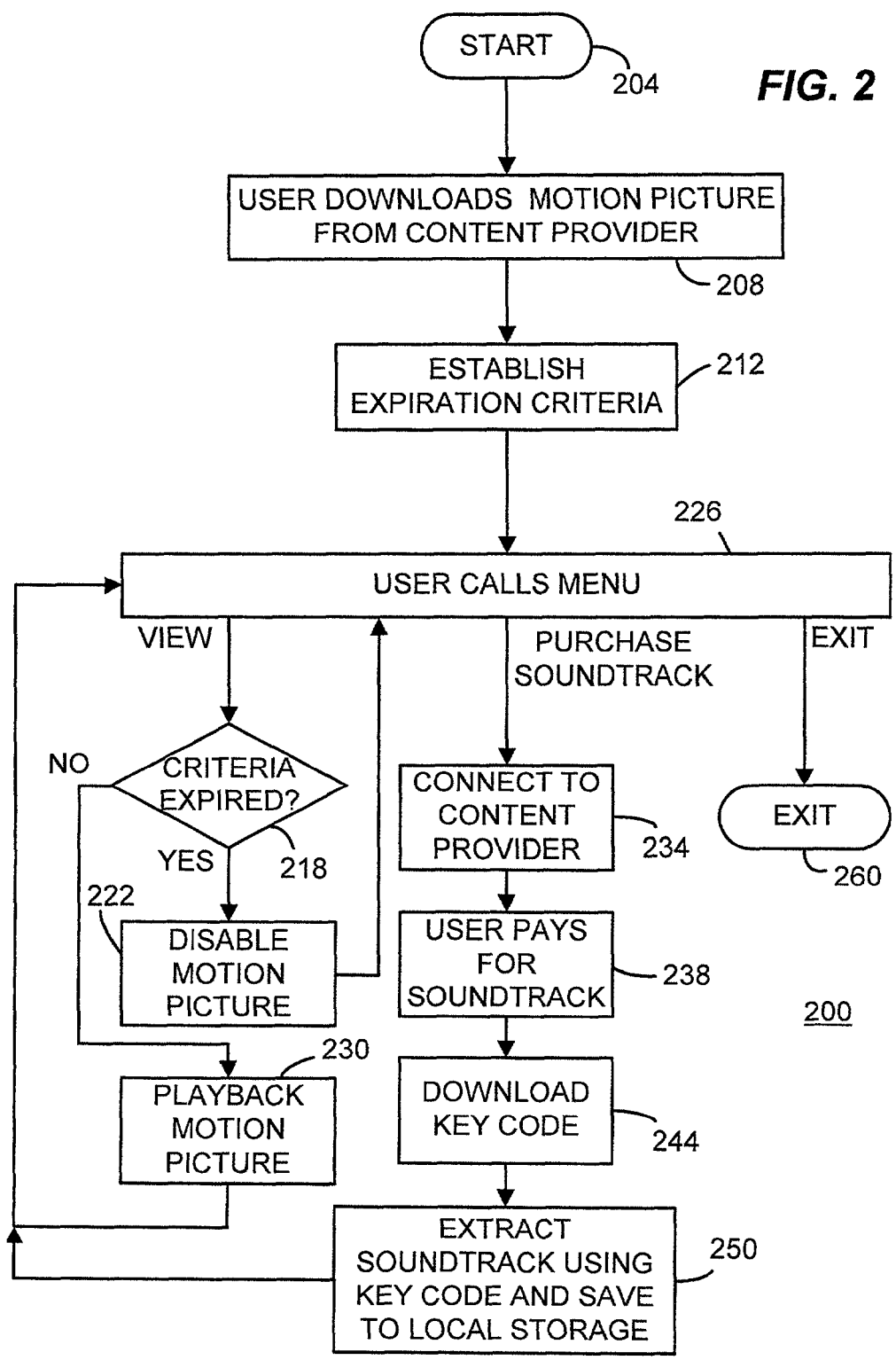
FIG. 2 is a flow chart depicting a method consistent with an embodiment of the present invention.

Purchase and storage of an audio portion such as the soundtrack for the motion picture may be carried out in any number of ways. FIG. 2 depicts one such process 200 for carrying out a transaction, in which the user of computer 104 can effect such a purchase of rights to a motion picture soundtrack governed by a usage rule that allows viewing the motion picture an unlimited number of times over a set time period. This exemplary process starts at 204. At 208 the user downloads a motion picture from content provider 110. This download process, in general, will involve the user (1) contacting an appropriate web site wherein the content provider 110 resides, (2) requesting purchase of rights to the motion picture, (3) providing a payment mechanism such as electronic cash or credit card, (4) and then receiving a download of a file or a plurality of files containing the motion picture content.

In the embodiment illustrated, the user purchases the motion picture as a download in a manner that provides the user with limited viewing rights to the motion picture. In this example, the user is granted limited rights to view the motion picture one or more times over a predetermined time period, for example measured from the download time. Such a transaction, therefore, is analogous to a rental. This embodiment is illustrated as only one possible embodiment with other embodiments involving, e.g., an outright purchase of the motion picture as opposed to more of a rental arrangement, or a one time or multiple time viewing arrangement.

In the arrangement of process 200, a usage rule is provided based on time of download or other trigger and an expiration criteria is set at 212 to initiate the time period (or other criteria) during which the user has rights to view the motion picture.

When the user wishes to view the motion picture or carry out another action associated with the motion picture, the motion picture file is called (e.g., from an appropriate media player application) to present the user with a menu at 226. This menu can provide any number of functions such as those conventionally provided in a digital versatile disc (DVD.) In the present embodiment, the user may elect to play back the motion picture at 230, which initiates playing of the full motion picture file. Once the criteria has expired (in this example, expiration of a time period) at 218, the motion picture is disabled in some suitable manner (e.g., erasure or corruption of the file) at 222 so that the user can no longer view the motion picture. Any attempt to view the motion picture will be responded to by a message that the motion picture has expired.

The user may also elect to purchase the soundtrack (or other audio or video or A/V content forming a part of the motion picture), in which case the computer 104 is initially connected to the content provider at 234 by appropriately addressing a universal resource locator (URL), for example by calling a browser application. The user then pays for the soundtrack at 234 by use of electronic cash or credit card, for example. At 244 the content provider 110 provides the user with a key code, in this embodiment. This key code may be an encryption key or other code that, when entered by the user, permits the user to extract the soundtrack (or other audio or video content) from the motion picture files at 250 and store the soundtrack to local storage as one or more digital files or directly to recordable media (e.g, magnetic media, optical media, CD ROM, DVD, etc.). The user may also choose to exit at the menu 226 and the program exits at 260. In any event, under the present scenario, the user can call the menu at 226 any time.

Under this scenario of process 200, the user purchases the rights to content in the form of the motion picture for a set period of time and during that period of time may view the motion picture any number of times (or some restricted number of times.) The user may also, during that time period, elect to purchase the soundtrack from the motion picture. This can be done from the start menu for the motion picture. By providing the user with this option at the startup menu (which may also be shown at the end of the motion picture as shown, and any time the motion picture is paused or stopped) the user is more inclined to purchase the soundtrack if he or she enjoyed the motion picture at the time of its presentation. Thus, it is believed that the immediacy of the opportunity to purchase the soundtrack will increase the opportunities for sale of the soundtrack. It is anticipated, but not required, that the stored soundtrack or other audio portion will have copyright protection to prevent copying or digital rights management to restrict the number of copies that can be made or manner of copying of the soundtrack (or place other restrictions on digital rights to the soundtrack in accordance with a usage rule) so that illegal distribution of the soundtrack is inhibited. Such methods are well known in the art.

Figure 3:
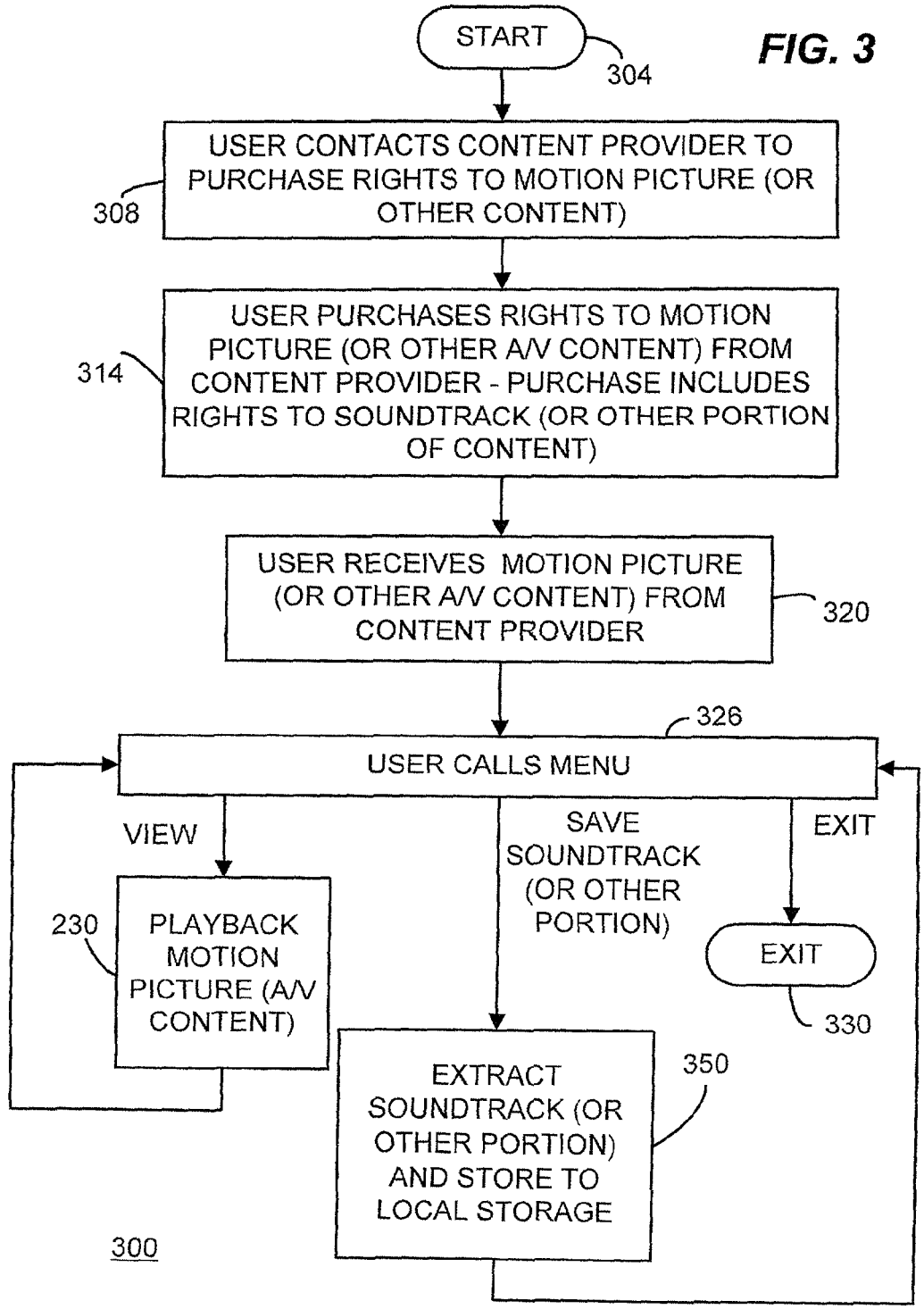
FIG. 3 is a flow chart depicting a method consistent with another embodiment of the present invention.

FIG. 3 depicts another embodiment of a method, consistent of the present invention, in which the user purchases rights to extract the soundtrack as a part of the purchase of the motion picture. The process for FIG. 3 is shown as process 300 starting at 304. At 308, the user contacts the content provider to purchase the motion picture. The user purchases the motion picture from the content provider at 314, with the purchase securing rights to the soundtrack. At 320 the user receives the motion picture from the content provider, in certain embodiments as a download (but this should not be considered limiting as other types of delivery of the content such as, for example, streaming and other real time delivery technologies can also utilize the present invention). At 326 the user again calls a similar menu that starts the motion picture or other motion picture related functions. The user can elect to view the motion picture from this menu, and playback occurs at 230. At the end of the motion picture, control returns to the menu 326. The user may also choose to extract the soundtrack or other audio portion at 350 and store it to local storage from menu 326, after which control returns to menu 326. The user may also choose to exit menu 326 at 330.

Again the storage of the soundtrack at 350 may be (but is not necessarily) effected using a type of copy protection which will limit the ability of the user to make illegal copies. Process 200 and 300 show two mechanisms for effecting the extraction and storage of a soundtrack or other audio portion of a motion picture based upon various purchase assumptions. However, those skilled in the art will also recognize that the user may purchase the motion picture content for a set period of time as described in connection with process 200 with that purchase also securing the right to extract and store a soundtrack as in process 300. Those skilled in the art will appreciate that many purchase scenarios are possible within the scope of the present invention wherein the user is provided with the ability to extract a soundtrack (or other audio or video portion) from a motion picture (or other A/V content) and thus treat it distinctly from the motion picture, e.g., purchasing, renting or receiving the soundtrack in accordance with digital rights defined by a usage rule.

Figure 4:
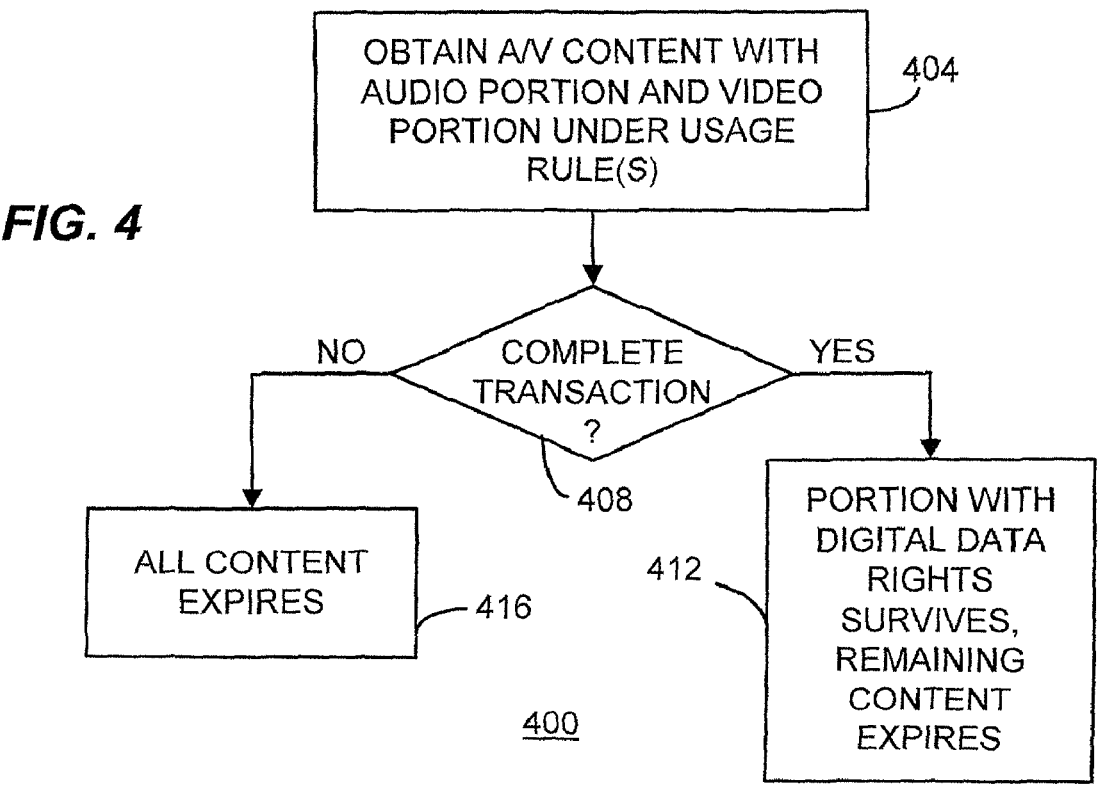
FIG. 4 is a flow chart depicting an overall method of acquiring rights to a portion of A/V content consistent with an embodiment of the present invention.

Heretofore, embodiments of the present invention have been described in conjunction with an exemplary embodiment wherein rights to store a motion picture soundtrack are acquired in conjunction with use of the motion picture itself. FIG. 4, however, illustrates in flow chart 400 another process consistent with the present invention in which digital rights to A/V content are acquired having an audio portion and a video portion at 404 under the terms of one or more usage rules. If the customer completes a transaction to obtain rights to one of the audio or video portion at 408, either as part of the process of obtaining the A/V content or prior to or subsequent thereto, then the portion for which rights are acquired survives at 412. Otherwise, assuming no persistent rights are retained, all of the content expires at 416. Thus, a customer can purchase rights to a portion of the A/V content separate and distinct from the A/V content itself. Those rights are independent (and possibly governed by separate and distinct usage rules) from those associated with the original A/V content containing both audio and video portions. The portion for which digital rights are acquired under the transaction of 408 may be audio, video or some combination thereof (e.g., an interview appearing as part of a documentary, a sequence of still images extracted from video content, or a music video appearing as a portion of other A/V content).

Figure 5:
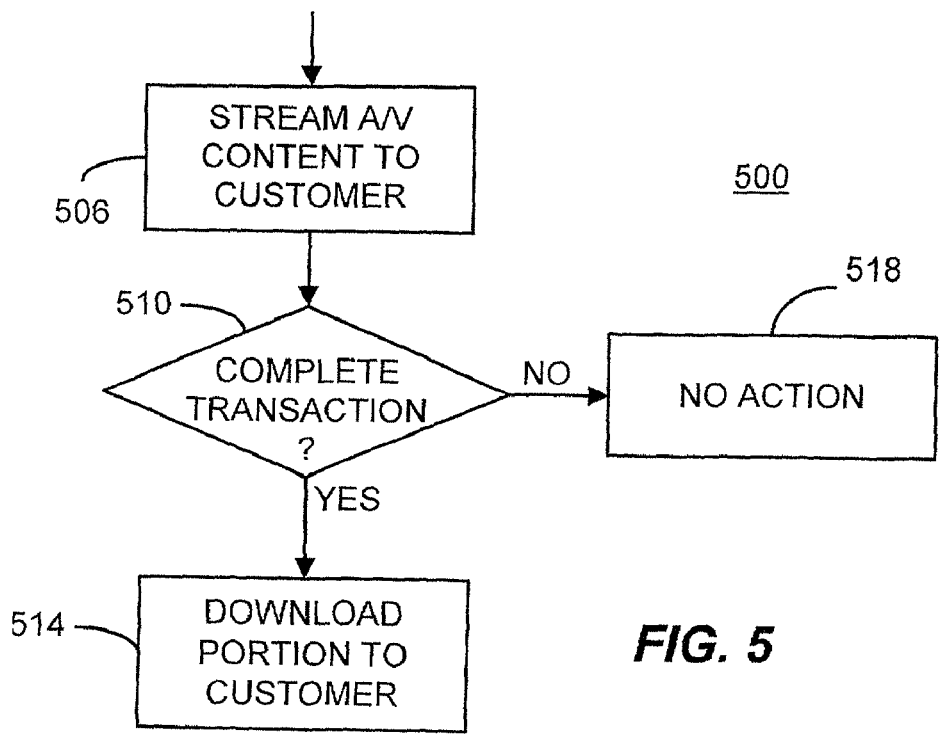
FIG. 5 is a flow chart depicting a method consistent with another embodiment of the present invention in which A/V content is streamed.

In one embodiment consistent with the present invention, the A/V content might be acquired by streaming technologies as illustrated in FIG. 5 in process 500. In this embodiment, the customer can be presented with the A/V content using streaming technology in 506 (or similarly, using real time transmission technologies as with digital cable television broadcasts). The customer is presented with an option to acquire rights to various portions of the streaming A/V content and, if he or she chooses to complete such a transaction at 510, the portion selected is downloaded at 514 to the customer. No such download takes place, as illustrated by 518, in the event the transaction is not completed. Many such variations are possible within the scope of the present invention.

Figure 6:
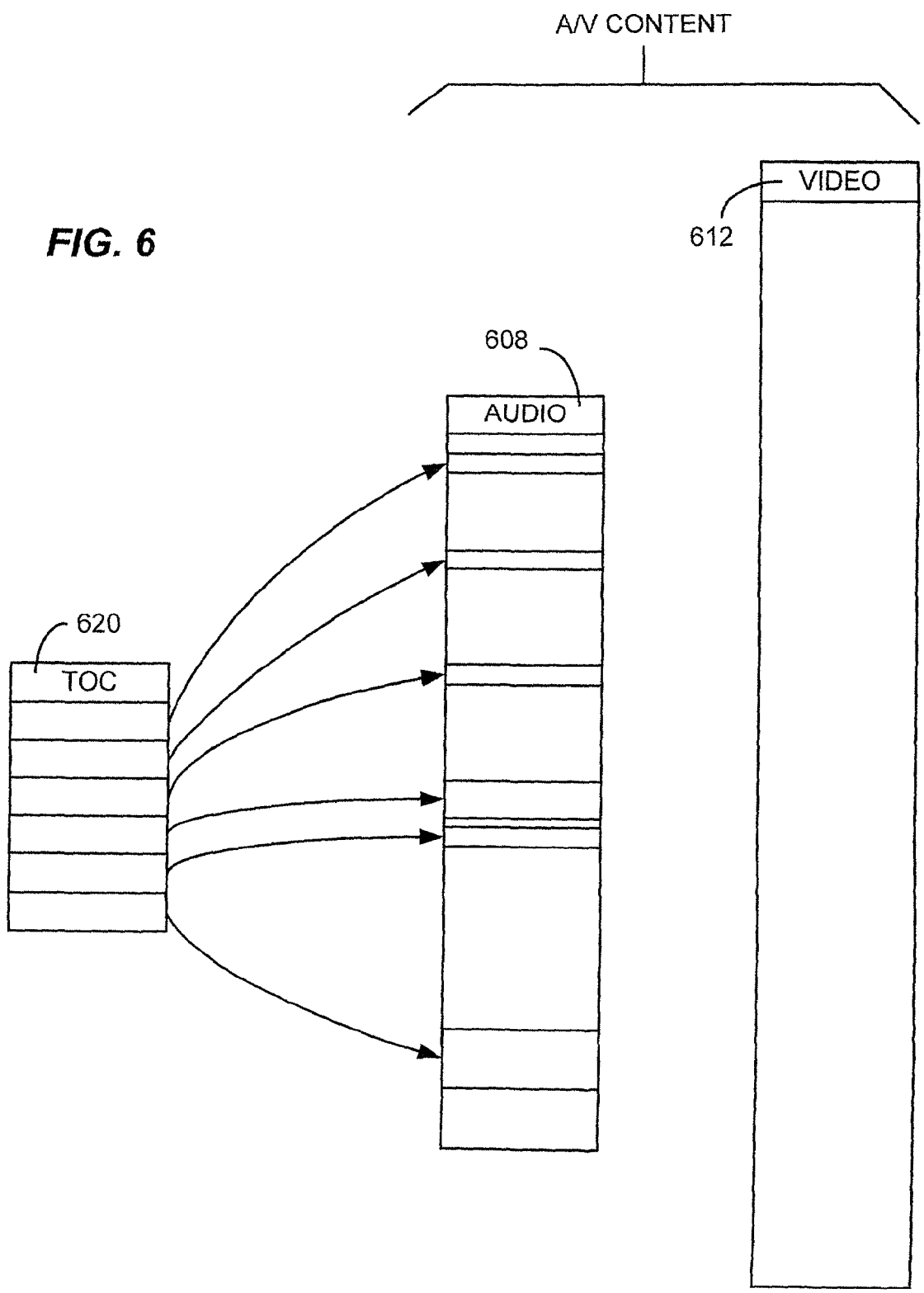
FIG. 6 depicts the audio, video and TOC portions of A/V content consistent with an embodiment of the present invention.

As previously described, one technique for enabling the customer to extract a portion of the A/V content is illustrated in FIG. 6. In this example, the A/V content itself is shown conceptually as two separate parts—audio part 608 and video part 612. In addition, a table of contents (TOC) file 620 is shown. In this example, the portion that can be extracted for separate storage is a portion of the full audio part 608. This could, for example, represent the soundtrack of a motion picture. Each entry in the TOC file 620 points to a segment of data in the audio part 608. When the customer completes the transaction to acquire rights to the audio portion indexed by the TOC 620, the segments pointed to by the TOC 620 are extracted and stored. While this illustration may suggest that the audio part 608 and the video part 612 are completely separated within the A/V content, this is not intended to be limiting and is illustrated in this manner for clarity. In fact, in digital transmissions such as an MPEG transport stream, audio, video and control data are intermingled in data packets that are sorted in accordance with the type of packet by a demultiplexer residing in receiving hardware or software. Accordingly, the TOC file may point to packet numbers, time stamps, or other identifiers as dictated by the specific technology employed to encode the A/V content to designate appropriate portions of the A/V content that can be separately stored. Thus, whatever technology is employed, the content provider may designate specific portions of A/V technology that can be separately acquired and establish rules for acquisition of those portions.

Figure 7:
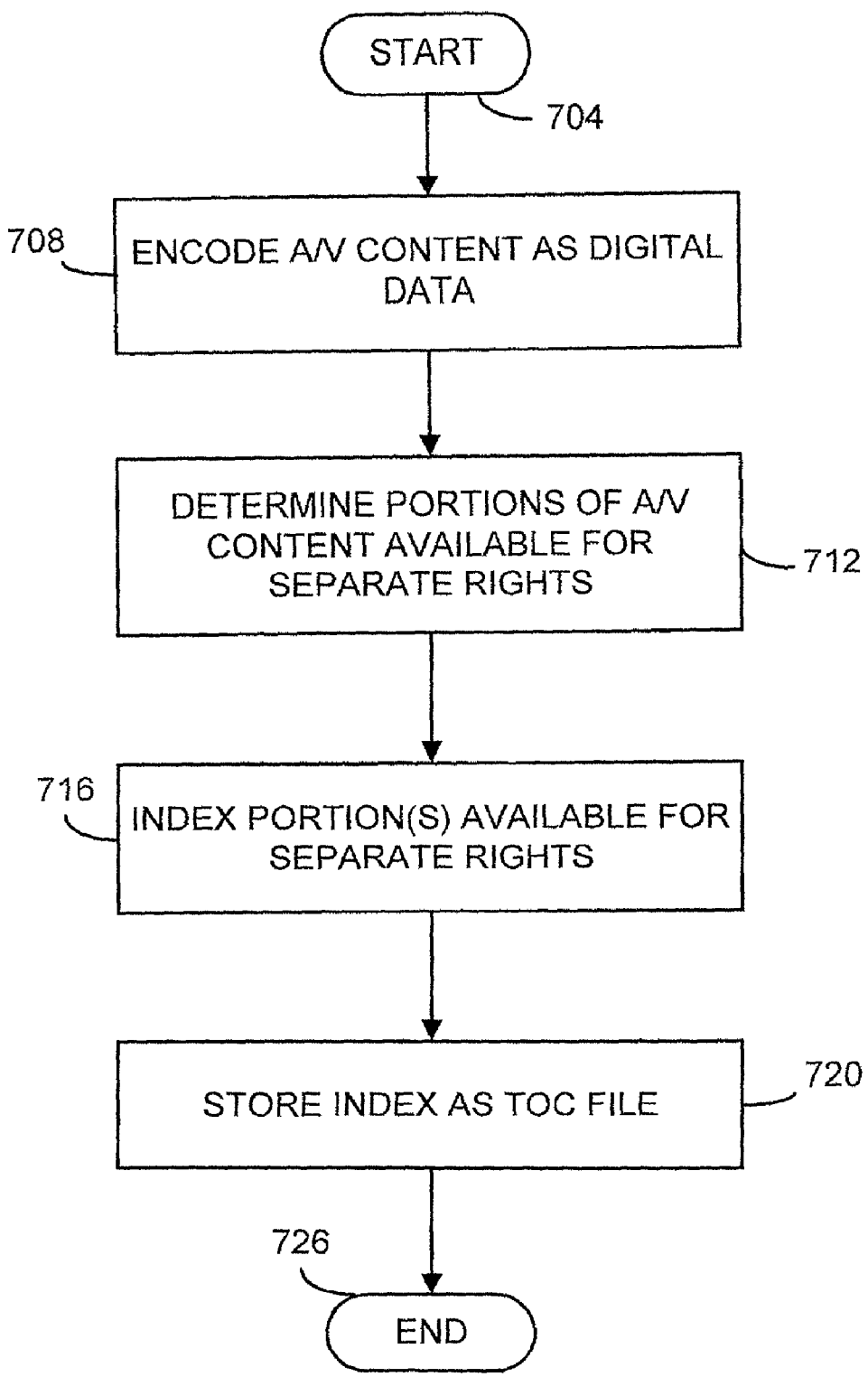
FIG. 7 is a flow chart depicting a method consistent with an embodiment of the present invention for creation of the A/V content together with a TOC.

A TOC 620 can be generated by the content provider as illustrated in FIG. 7 in process 700 starting at 704. If not already digitally encoded, the A/V content of interest is digitally encoded at 708 using any suitable encoding technique. The content provider determines at 712 which portions of the content are to be made available for a customer to acquire separate rights at 712. Those portions of the content are then indexed at 716 and the index is stored as a TOC file at 720. The process ends at 726. Although illustrated as a single TOC file indexing a single portion of the A/V content throughout, this should not be considered limiting since multiple TOC files can be created indexing multiple portions of the A/V content. Similarly, a single TOC file can be used to index multiple portions of the A/V content without departing from the present invention. Additionally, the TOC can index the entire audio portion 608, the entire video portion 612 or any part thereof, which is to be considered an audio portion or a video portion, without departing from the invention.

Figure 8:
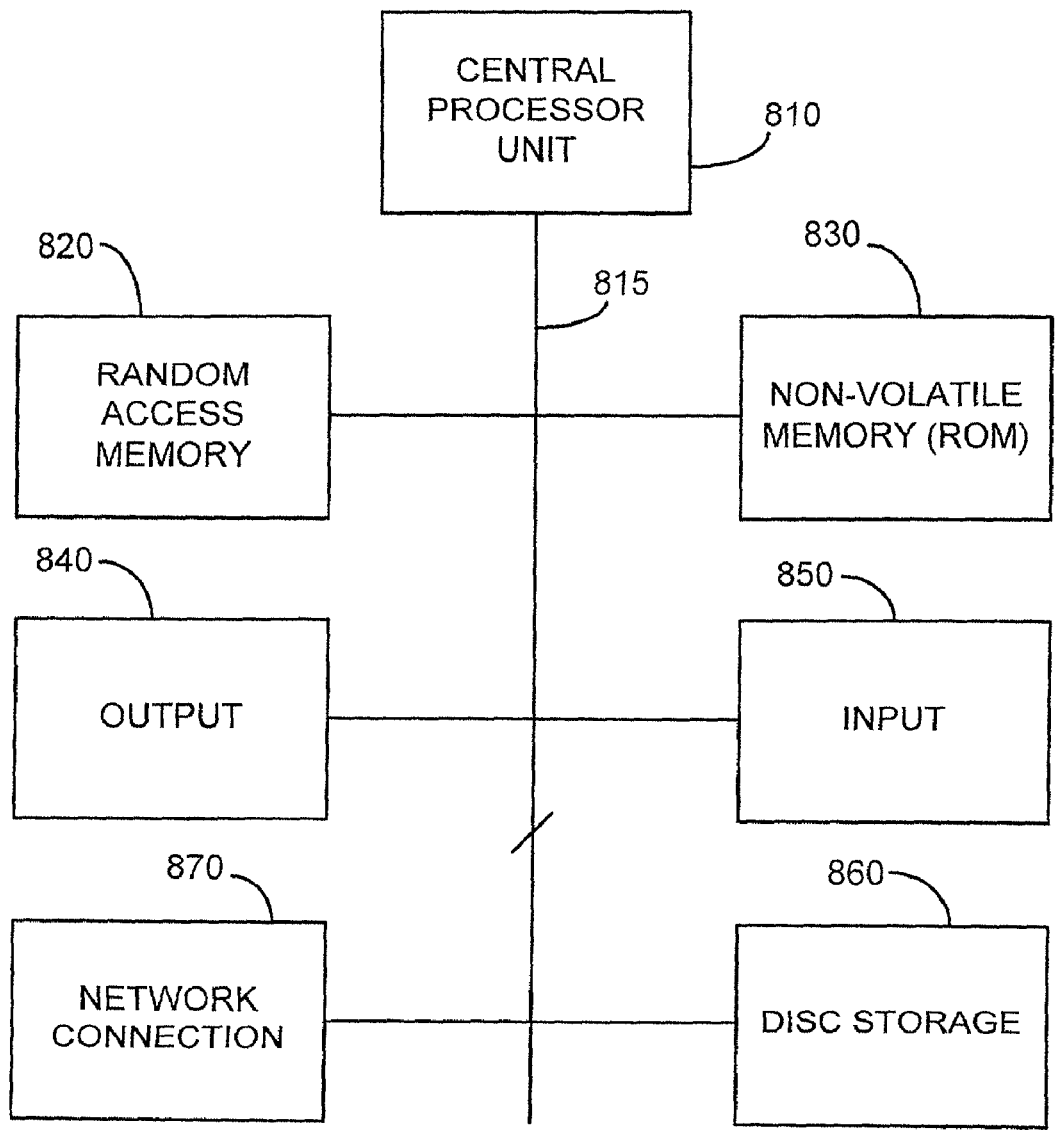
FIG. 8 illustrates a general purpose computer suitable for operating as either server or user computer 104 for carrying various processes described herein.

The processes previously described as carried out on a computer system, for example, a computer system which resides at the content provider 110, or an agent thereof, and functions as an electronic commerce (e-commerce) server or user computer 104. Such a computer system is depicted in FIG. 8 as 800. Computer system 800 includes a central processor unit (CPU) 810 with an associated bus 815 used to connect the central processor unit 810 to Random Access Memory 820 and Non-Volatile Memory 830 in a known manner. An output mechanism at 840 may be provided in order to display or print output for the computer administrator. Similarly, input devices such as keyboard and mouse 850 may be provided for the input of information from the computer administrator. Computer 800 also may include disc storage 860, or any mass storage media known in the art, for storing large amounts of information such as the content database 120 as well as any other information as required. Computer system 800 is coupled to the network (e.g., the Internet) using a network connection 870 such as an Ethernet adapter coupling computer system 800 through a fire wall and/or locally a network to the Internet. In the case of the user computer 104, a modem or other access device (not shown) may also be present. The computer system 800 could be embodied in a personal computer, a Set-Top Box or any other suitable consumer electronic device, Storage of the selected portion of the A/V content may be on local mass storage such as the hard disc drive 860 or a CD ROM (not shown), or may be to a designated storage location on a network (e.g., a designated storage location on the Internet, or a file server on a local or wide area network).

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data (e.g., the soundtrack files) used to implement the embodiments described above can be implemented using disc storage as well as other forms of storage including, but not limited to, Compact Discs (CD), Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments described herein, is implemented in certain embodiments using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, and additional operations can be added or operations can be removed without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of delivering digital content, comprising:
    receiving by an e-commerce server a request from a customer for transfer of A/V content, including a soundtrack, in digital form to the customer at a customer storage or playback device;
    receiving by an e-commerce server payment from the customer for the transfer of the A/V content in accordance with a first usage rule;
    transferring audio/video (A/V) content in digital form from a content provider to the customer in accordance with the first usage rule, the digital form of the A/V content comprising at least a soundtrack and a video portion;
    providing limited usage rights by an e-commerce server to the A/V content to the customer;
    presenting the A/V content to the customer for display on an entertainment system display;
    displaying by a menu on an entertainment system display, soundtrack portions of the A/V content having additional usage rights beyond said limited usage rights under the first usage rule;
    receiving by an e-commerce server a request from the customer for acquisition of the additional usage rights beyond the first usage rights to the selected portions of the A/V content as a second transaction;
    receiving by an e-commerce server payment from the customer for the second transaction; and
    as a result of receiving payment for said second transaction, sending a key code to the user from the e-commerce server;
    extracting and storing with the key code, the soundtrack of the A/V content from the original A/V content according to said additional usage rights beyond the first usage rights.

2. The method according to claim 1, where the transaction attaches a second usage rule to the soundtrack.

3. The method according to claim 2, where the second transaction comprises one of: a purchase of unlimited rights to play the soundtrack, a purchase of rights to play the soundtrack for a designated period of time, and a purchase of rights to play the soundtrack a designated number of times.

4. The method according to claim 3, where the A/V content further comprises a table of contents portion (TOC) that indexes the soundtrack.

5. The method according to claim 1, where the presenting takes place within a designated period of time defined by the first usage rule.

6. The method according to claim 1, where the A/V content comprises one of a motion picture, a television program, a documentary and a music video.

7. The method according to claim 1, where the second transaction further comprises transferring additional A/V content as one or more digital files, streaming the A/V content, and transmitting the A/V content as a real time transmission.

8. The method according to claim 1, wherein the storing further comprises receiving a download from the content provider.

9. A system of delivering digital content, comprising:
    one or more processors;
    a memory connected to the one or more processors, and storing computer readable instructions, that when executed by the one or more processors causes the one or more processors to perform the method of:
    receiving by an e-commerce server a request from a customer for transfer of A/V content, including a soundtrack, in digital form to the customer at a customer storage or playback device;
    receiving by an e-commerce server payment from the customer for the transfer of the A/V content in accordance with a first usage rule;
    transferring audio/video (A/V) content in digital form from a content provider to the customer in accordance with the first usage rule, the digital form of the A/V content comprising at least a soundtrack and a video portion;
    providing limited usage rights by an e-commerce server to the A/V content to the customer;
    presenting the A/V content to the customer for display on an entertainment system display;
    displaying by a menu on an entertainment system display, soundtrack portions of the A/V content having additional usage rights beyond said limited usage rights under the first usage rule;
    receiving by an e-commerce server a request from the customer for acquisition of the additional usage rights beyond the first usage rights to the selected portions of the A/V content as a second transaction;
    receiving by an e-commerce server payment from the customer for the second transaction; and
    as a result of receiving payment for said second transaction, sending a key code to the user from the e-commerce server;
    extracting and storing with the key code, the soundtrack of the A/V content from the original A/V content according to said additional usage rights beyond the first usage rights.

10. The system according to claim 9, where the transaction attaches a second usage rule to the soundtrack.

11. The system according to claim 9, where the second transaction comprises one of: a purchase of unlimited rights to play the soundtrack, a purchase of rights to play the soundtrack for a designated period of time, and a purchase of rights to play the soundtrack a designated number of times.

12. The system according to claim 9, where the A/V content further comprises a table of contents portion (TOC) that indexes the soundtrack.

13. The system according to claim 9, where the presenting takes place within a designated period of time defined by the first usage rule.

14. The system according to claim 9, where the A/V content comprises one of a motion picture, a television program, a documentary and a music video.

15. The system according to claim 9, where the second transaction further comprises transferring additional A/V content as one or more digital files, streaming the A/V content, and transmitting the A/V content as a real time transmission.

16. The system according to claim 9, where the storing further comprises receiving a download from the content provider.

17. A non-transitory computer readable storage medium storing instructions that when executed by one or more processors causes the one or more processors to perform the method of:

receiving by an e-commerce server a request from a customer for transfer of A/V content, including a soundtrack, in digital form to the customer at a customer storage or playback device;

receiving by an e-commerce server payment from the customer for the transfer of the A/V content in accordance with a first usage rule;

transferring audio/video (A/V) content in digital form from a content provider to the customer in accordance with the first usage rule, the digital form of the A/V content comprising at least a soundtrack and a video portion;

providing limited usage rights by an e-commerce server to the A/V content to the customer;

presenting the A/V content to the customer for display on an entertainment system display;

displaying by a menu on an entertainment system display, soundtrack portions of the A/V content having additional usage rights beyond said limited usage rights under the first usage rule;

receiving by an e-commerce server a request from the customer for acquisition of the additional usage rights beyond the first usage rights to the selected portions of the A/V content as a second transaction;

receiving by an e-commerce server payment from the customer for the second transaction; and as a result of receiving payment for said second transaction, sending a key code to the user from the e-commerce server;

extracting and storing with the key code, the soundtrack of the A/V content from the original A/V content according to said additional usage rights beyond the first usage rights.

18. The storage medium according to claim 17, where the transaction attaches a second usage rule to the soundtrack.

19. The storage medium according to claim 17, where the second transaction comprises one of: a purchase of unlimited rights to play the soundtrack, a purchase of rights to play the soundtrack for a designated period of time, and a purchase of rights to play the soundtrack a designated number of times.

20. The storage medium according to claim 17, where the A/V content further comprises a table of contents portion (TOC) that indexes the soundtrack.

21. The storage medium according to claim 17, where the presenting takes place within a designated period of time defined by the first usage rule.

22. The storage medium according to claim 17, where the A/V content comprises one of a motion picture, a television program, a documentary and a music video.

23. The storage medium according to claim 17, where the second transaction further comprises transferring additional A/V content as one or more digital files, streaming the A/V content, and transmitting the A/V content as a real time transmission.

24. The storage medium according to claim 17, where the storing further comprises receiving a download from the content provider.

* * * * *